(12) United States Patent
Louth

(10) Patent No.: US 10,148,388 B1
(45) Date of Patent: Dec. 4, 2018

(54) DIGITAL DATA MUTATION DETECTOR AND CONTROLLER IN WEB APPLICATION INTERFACE

(71) Applicant: BitCine Technologies Incorporated, Toronto (CA)

(72) Inventor: Tyson G. E. Louth, Toronto (CA)

(73) Assignee: BitCine Technologies Incorporated, Toronto (CA)

( * ) Notice: Subject to any disclaimer, the term of this patent is extended or adjusted under 35 U.S.C. 154(b) by 0 days.

(21) Appl. No.: 15/799,861

(22) Filed: Oct. 31, 2017

(51) Int. Cl.
  *H04L 1/00* (2006.01)
  *H04L 29/08* (2006.01)
  *H04N 21/2389* (2011.01)
  *H04L 1/18* (2006.01)

(52) U.S. Cl.
  CPC .......... *H04L 1/0009* (2013.01); *H04L 1/1877* (2013.01); *H04L 29/0809* (2013.01); *H04N 21/23892* (2013.01)

(58) Field of Classification Search
  CPC ..................................... H04L 1/0009
  USPC ....................... 714/774, 776, 788
  See application file for complete search history.

(56) References Cited

U.S. PATENT DOCUMENTS

| | | | |
|---|---|---|---|
| 9,792,405 B2* | 10/2017 | van Rooyen | G06F 19/24 |
| 9,886,458 B2* | 2/2018 | Jung | G06F 17/30312 |
| 2014/0123299 A1* | 5/2014 | Jung | G06F 17/30312 |
| | | | 726/26 |

* cited by examiner

*Primary Examiner* — Fritz Alphonse
(74) *Attorney, Agent, or Firm* — Blake, Cassels & Graydon LLP; Brett J. Slaney

(57) ABSTRACT

With the proliferation of digital tool and content, it is becoming easier for adversaries to copy and modify digital content without detection or control by a content owner. Computing systems are provided to detects client-side data mutations. Responsive to a request to access the content data from a client device, a server compiles data that includes the content data, a mark and executable instructions for detecting data mutations, and sends this data to the client device. The client device then, based on the received instructions, stores the local environment properties relating to playing or viewing the content data, incorporates the mark with the content data, and allows the content data to be played or viewed or accessed. The client device also conducts checks in relation to the content data, the marker, and the local environment properties. If a data mutation is detected, the client device initiates an alert protocol.

30 Claims, 11 Drawing Sheets

DIGITAL DATA MUTATION DETECTOR AND CONTROLLER IN WEB APPLICATION INTERFACE

TECHNICAL FIELD

The following relates to automatically detecting data mutations and controlling the same in a web application interface.

DESCRIPTION OF THE RELATED ART

In many cases, a first party may wish to transmit digital data to a second party, or provide the second party with access to the digital data, under controlled technical parameters. For example, the first party uses one or more technical processes to ensure that the digital data is not changed by the second party, or is not copied by the second party, or is not redistributed by the second party, or a combination thereof. It is herein recognized that there are many with these technical processes, as described below.

There are several technical approaches to controlling these digital rights. For example, the first party could embed digital watermarks into the digital data. These digital watermarks, for example, could be detectable or undetectable to human senses. In many examples, watermarks are visible. Even then, adversarial people have been able to digitally remove these watermarks from the digital data. For example, an adversary can access the source code to delete the watermark, or copy the data and the post-processing the data to edit-out the watermark.

Another technical approach to protecting digital data includes using passwords to restrict access to the data. Yet another technical approach is to encrypt the data for transmission to the second party, or for access by the second party. Yet another approach is for only allowing a certain amount of time to access the digital data, or for only allowing a certain number of instances (e.g. one instance only, or some other number) to access the digital data. These technical defenses can be implemented in the code of a digital data platform. However, adversaries who are technically skilled can access and modify the code to overcome these technical defenses.

It will be appreciated that sometimes, the second party, with which the first party has some relationship, is the adversary. In other words, the second party may secretly copy, modify or distribute the first party's digital data without the awareness of the first party.

Many types of digital data are therefore copied, modified, or distributed, or a combination thereof, without permission of the first party. In many cases, the digital data is copied, modified or distributed, or a combination thereof, by one or more adversaries and is done without giving any notice to the first party. Or, in other words, it is very difficult for a first party to digitally monitor whether or not their digital data has been copied, modified or distributed.

These technical difficulties are further made complex when a first party transmits digital data over the Internet to a second party, or provides the second party with access to the digital data over the Internet, as the Internet environment is prone for copying, modifying, and distributing data. These technical vulnerabilities are further heightened when the digital data is intended to be accessible by the second party via a web application interface, such as an Internet browser application or web browser application (e.g. Google Chrome, Mozilla Firefox, Internet Explorer, Microsoft Edge, Safari, etc.).

In an example embodiment, digital multimedia data, digital video data, digital audio data, digital images, digital text, and other digital data are therefore at risk of being copied, modified, or distributed, or a combination thereof, without permission from the first party.

BRIEF DESCRIPTION OF THE DRAWINGS

Embodiments will now be described by way of example only with reference to the appended drawings wherein.

DETAILED DESCRIPTION

Figure 1:
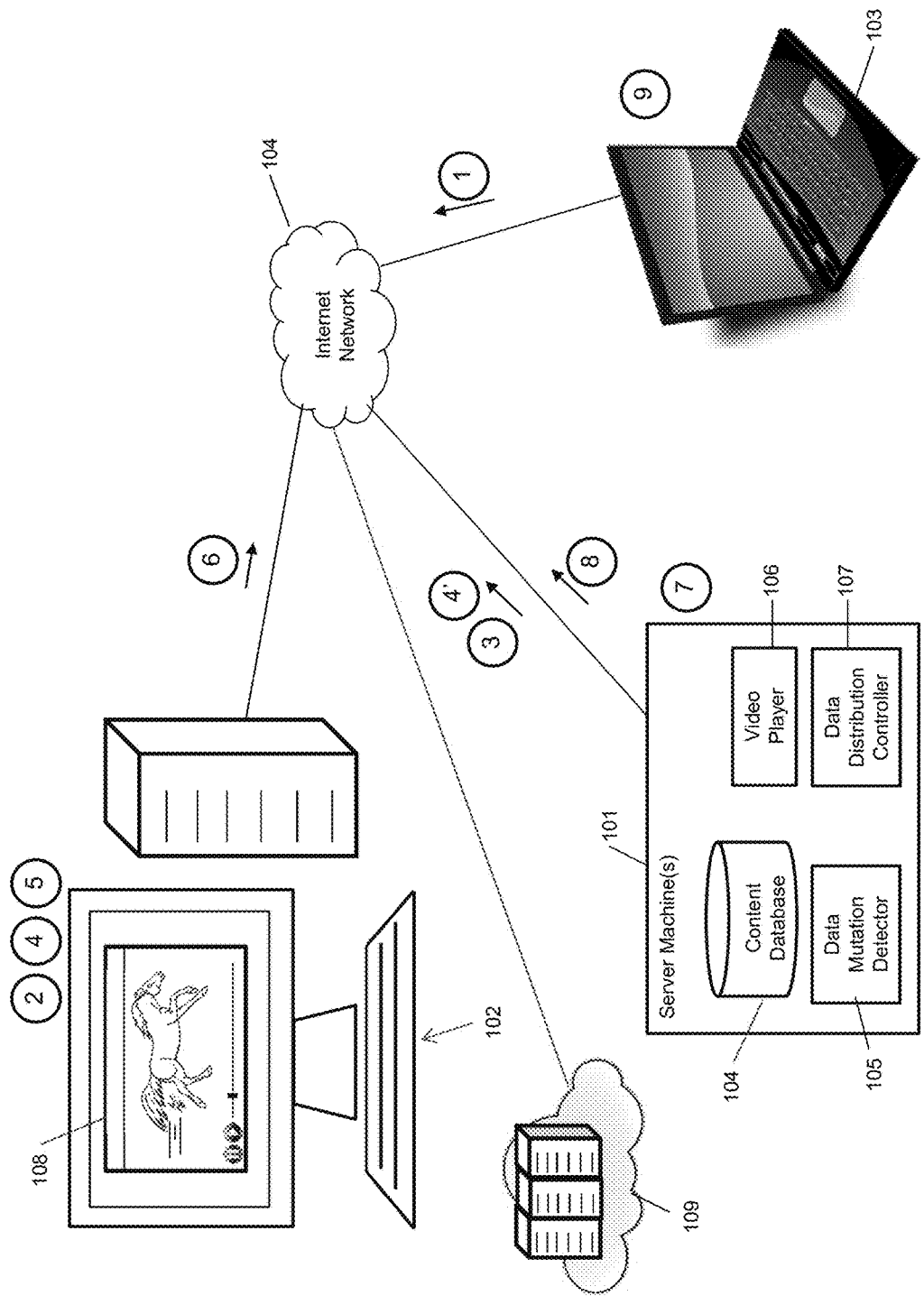
FIG. 1 is a schematic diagram of an example computing system for detecting data mutations in an Internet-connectable application.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Many of the examples described herein relate to video data, audio data and multimedia data. However, the principles described herein are also applicable to detecting mutations in other types of digital data, and can be used to help mitigate the risks of an adversary copying, distributing or modifying the other types of digital data.

As noted above, a first party wishes for a second party to view or see, or both, digital data. For example, the first party has control over a digital video file or a digital audio file, or the like. Non-limiting examples of digital video file formats include: .m3u, .mpeg, .mpeg-dash, .mp4, .rm, .webm, .mov, .qt, .gif, .flv, .f4v, .avi, .3gp, .3g2, .svi, .m4v and .nsv. Non-limiting examples of digital audio file formats include: .wav, .webm, .ra, .wma, .opus, .m4p, .3gp, .mp3 and .m4b. It will be appreciated that the principles described herein are applicable to other currently known and future known data formats. It will also be appreciated that some data formats are suitable for both audio and video data, although a data file in such a format can include one of, or both of, audio and video data.

In an example embodiment, there are some video formats that are suitable for streaming (e.g. including, but not limited to, .m3u, .mpeg and .mpeg-dash).

In an example embodiment, a first party transmits to the video data file or audio data file to the second party so that the data file is accessible via a web browser. For example, via a web browser, the second party can see the video or hear the music.

It is herein recognized that current technical approaches to protecting video data include watermarking. For example, when the first party generates a video file, it "burns" a watermark into the video file. Burning, also called burn marking, is a digital process in which a watermark is digitally hardcoded into each frame of a digital video. This is a data intensive process and is time consuming. The longer the video, the higher the number of frames, and, thus, the longer the time required to burn a watermark to each of the frames.

In some situations, it is desirable to burn different coded watermarks into different copies of the same video data, in order to differentiate between different copies of the same video data. For example, a first copy of video would have burned into it a first watermark and a second copy of the same video data would have burned into it a second watermark. Therefore, the digital burning process to add a watermark would be multiplied in length, depending on the number of different watermarks used. For example, if five different watermarks are used for five copies, then the burning process would need to be replicated five times, and the burning process would take five times longer. Creating tens or hundreds or thousands of copies each with their own watermarks becomes very difficult and impractical given the digital burning process.

It is herein recognized that digital watermarks can be overlaid the video player while the digital video is playing. This reduces the amount of hardware resources (e.g. memory and processor usage). This process also saves time, since it does not require a pre-processing step to burn a watermark into the digital video. However, it also herein recognized that an adversary skilled in computer programming may be able to disable the computer executable instructions (e.g. code) that causes the watermark to be overlaid the video by the video player.

It will be appreciated that a video player is computer program or 'app' that plays the video data. Non-limiting examples of video players, also called media players, include Windows Media Player, QuickTime Player, VLC Player, KMPlayer, MPlayer, XBMC, Media Player Classic, GreTech Online Movie Player, and PotPlayer.

It is also appreciated that these same issues are applicable in audio data. For example, an audio watermark can be burned (e.g. hardcoded) into an audio file (e.g. a song, a discussion, etc.), but this is time consuming and consumes hardware resources. An audio watermark, for example, is a sound or tone that is inaudible to human ears, but is able to be detected by machines (e.g. microphones). An audio watermark could alternatively be overlaid the audio file by an audio player (e.g. a program or application that plays audio data) while the audio data is being played by the audio player. This alternative, however, could be subject to risk of being "hacked" by an adversary. It is herein recognized that audio watermarks could be also applied to videos, including by overlaying an audio watermark by a video player.

To address one or more of these technical problems, a data mutation detector and controller is provided to be used with a web application interface. A web application interface includes an Internet browser or some other application or software that connects to the Internet. A server sends content data itself (e.g. video data, audio data, text data, multimedia data, or other data, a data link to the content data, or a combination thereof), a marker (e.g. a video watermark, an audio watermark, or some other digital watermark), and mutation detector computer executable instructions to a receiving party's computing device (e.g. a desktop computer, a mobile device, a tablet, a laptop, a video game console, a smart TV, etc.). More generally, the marker is digital data that is intended to be difficult to be combined with the content data. The marker may or may not be detected by human senses (e.g. seen, heard, felt, etc.). The marker is detectable by a machine (e.g. a computer, sensors, etc.).

The receiving party's computer device receives this data, and based on the mutation detector executable instructions, stores local environment properties related to playing/viewing/accessing the content data. The receiving party's computing device then embeds, incorporates, or overlays the marker with the content data. The mutation detect executable instructions then allows the content data to be played/viewed/accessed by the web application interface, so that a user can see, hear, or both, or otherwise consume the content data. At timed intervals, the receiving party's computing device conduct checks in relation to one or more of: the content data, the marker, and the location environment properties. If a mutation is detected in one or more of these checks, the receiving party's computing device sends an alert message to the server. The server takes action to prevent or mitigate the sharing of the content data. The receiving party's computing device also automatically takes action to stop the playing/viewing/accessing of the content data via the web application interface.

It will be appreciated that content data includes video data in some of the examples described herein. However, in other example embodiments, content data includes other types of data.

Turning to FIG. 1, an example embodiment of a computing system is shown, including the flow of data between computing devices in the system. The system includes one or more server machines 101, also herein after called a server, a first user device 103 and a second user device 102. The first user device 103 provides permission over access to digital content. The second user device 102 accesses or receives the content, or both. The server 101, the first user device 103 and the second user device 102 are in data communication over a data network (e.g. the Internet) 104. Although the Internet is the most widely used data network, the principles described herein are also applicable to other types of networks, including, but not limited to, private data networks, closed data networks and local area networks.

The second user device is also herein referred to as a client device of the server, as well as a receiving party's user device and a receiving party's computing device.

In FIG. 1, the first user device is a laptop and the second user device is a desktop computer. However, it will be appreciated that the user devices can be any one of a laptop, desktop computer, mobile device, tablet, video game console, multimedia projector, smart television, etc. More generally, the user devices include a device to output the digital content, a user input device, a processor, memory devices, and a communication device to send and receive data over the network 104.

Although a server 101 is shown, the server can include multiple server machines that communicate with other third party server machines (e.g. cloud servers) 109. The functionality and the data of the server 101 can be distributed amongst these different server machines. The server 101 includes a content database 104 that stores digital content. The server also includes a data mutation detector 105 that includes executable instructions for detecting data mutations and memory for storing related data. The server also includes a video player 106 that plays digital videos. The sever also includes a data distribution controller 107 that includes executable instructions for mapping the markings to the content data and for controlling the digital transmission or accessibility to the content data, or both.

In an example embodiment, the actual content data is stored is stored on the server 101, in the content database 104. The server 101 then sends the content data directly to the second user device 102.

In another example embodiment, the actual content data is stored on a third party server (e.g. cloud server) 109, and the server 101 stores an intermediate data link that links to the content data on the third party server. In such an embodiment, the type of content data stored on the server 101 is an intermediate data link that links to the actual content data being stored on the third party server. In particular, the server 101 stores the multiple intermediate data links in its content database 104, whereby each data link is specific to a different content data file. The server 101 transmits a specified intermediate data link to the second user device 102. In turn, the second user device 102 and the third party server 109 communicate with each other so that the actual content data is sent by the third party server to the second user device 102.

In an example embodiment, the third party server 109 is a Content Distribution Network (CDN), and the intermediate data link to the content data is called a CDN link. In other words, the server 101 stores multiple CDN links in its content database 104, and it transmits a specified CDN link to the second user device 102. Non-limiting example of CDNs include those under the trade names Cloudflare and Akamai.

Below are example flows of information, as shown by the numbers in the circles in FIG. 1.

At operation 1, the first user (of the first user device 103) sends a video to a second user (of the second user device 102). For example, the sending process includes the first user sending a network data link of the video, where the network data link identifies the location of the video on the server. In another example aspect, the sending process includes identifying other conditions related to the video. These other conditions include, for example, one or more of the following: the type of the second user device (e.g. laptop, smart phone, tablet, etc.) able to access the video; the geographical location of the second user device; the identity of the second user or their device, or both; the number of times the second user can watch the video; the time frame (e.g. dates, hours, etc.) that the second user can watch the video; the size or resolution, or both, that the video can be viewed; the ability for the second user to "share" the video (e.g. send the data link to other users); and the type of mark or marks to be incorporated with the video. This additional information can be automatically identified by the server based on information in the data link (e.g. an identifier in the data link).

In an example embodiment, the geographical location of the second user device can be determined based on the Internet Protocol (IP) address or from a geolocation API of a web-browser, or some other data indicator, or a combination thereof. In an example embodiment, a geolocation API interacts with the second user device's GPS or location services, or a combination thereof, to help obtain geographic location of the second user's device.

In an example embodiment, the type of the second user device is determined by executable instructions that are executed by the client device upon loading the web page.

In an example embodiment, the network data link is a URL such as "website.com/view/123456789". In particular, in this example, the URL includes a website with a suffix portion having "123456789", which is a unique ID that identifies the location of the video on the video server. It will be appreciated that other formats of data links can be used.

At operation 2, the second user at the second user device 102 receives the data link. The data link is accessed via a web application on the second user device 102, which in turn initiates transmitting a message to the server, the message including a request to connect to the server 101 to access the specific video.

At operation 3, the server 101 receives the request from the second user device 102, and sends the relevant video data, watermark, and other executable instructions (e.g. code) and data, including the executable instructions for the mutation detector. In an example embodiment, the watermark and the executable instructions are automatically customized by the server to correspond with the video data. In other words, a different video or different instance of a video being sent to different receiving users has associated with it a different watermark or a different executable instructions, or both. The server automatically determines the relevant video data and the corresponding data and/or executable instructions to send or respond to the second user device based on the received message, which identifies the specific video data and the related information.

In an example embodiment, at either operation 3 or operation 4, or both, the server 101 or the second user device 102 conduct initial checks, including, but not limited to: determining whether or not the network data link has expired; determining if the second user device matches a specified type (e.g. a laptop, a smart phone, a tablet, etc.), determining whether or not the second user device matches a specified location; determining if a correct password has been entered; determining if the number of views has already exceeded the maximum number of specified view; and other conditions noted above. In an example aspect, if these initial checks are passed, then the content player (e.g. video player or other type of player) is loaded. Otherwise, the content player is not loaded.

At operation 4, the second user device 102 receives the data and executable instructions from the server, and loads the data via its web application. It also locally executes the executable instructions via its web application. These instructions include, for example, initiating or accepting, or both, a stream of video data from the server. At operation 4', the server sends a stream of video data to the second user device. As a result of loading the video data, whether streaming or not streaming, the video is able to be played via a graphical user interface (GUI) of the web application 108.

At operation 5, the second user device 102 detects a data mutation based on the locally executed executable instructions. The data mutation includes, for example, a change in the executable instructions or a change in the data itself (e.g. the watermark), or both. In response to the detection, the second user device executes one or more of the following operations: stops the display or playing of the video data; and redirects the web application to another web page or to another data link.

At operation 6, the second user device 102 sends an alert message to the server 101.

At operation 7, in response to operation 6, the server cuts off the data link to the second user device. This may include the server altogether deleting the data link, or the server tagging the data link as inaccessible, so that no user device can access the data on the server via the data link. In another example embodiment, the server marks or tags the data link entry in the database as 'expired' and, consequently, any further requests to that link will fail.

At operation 8, the server automatically compiles and sends a notification to the first user (e.g. via email, text messaging, instant messaging, etc.). The notification includes, for example, information about the detected data mutation. Examples of such information include: the identity of the second user or the second user device 102, or both (e.g. name, contact information, IP address, location associated with IP address, etc.); when the detection occurred; and the type of data mutation that was detected. The notification also includes, for example, a data link, that when selected by the first user, automatically generates a message (e.g. an email, text message, instant message, etc.) to the second user regarding the detected data mutation and the now inaccessible content.

At operation 9, the first user at the first user device 103 receives the notification.

Figure 2:
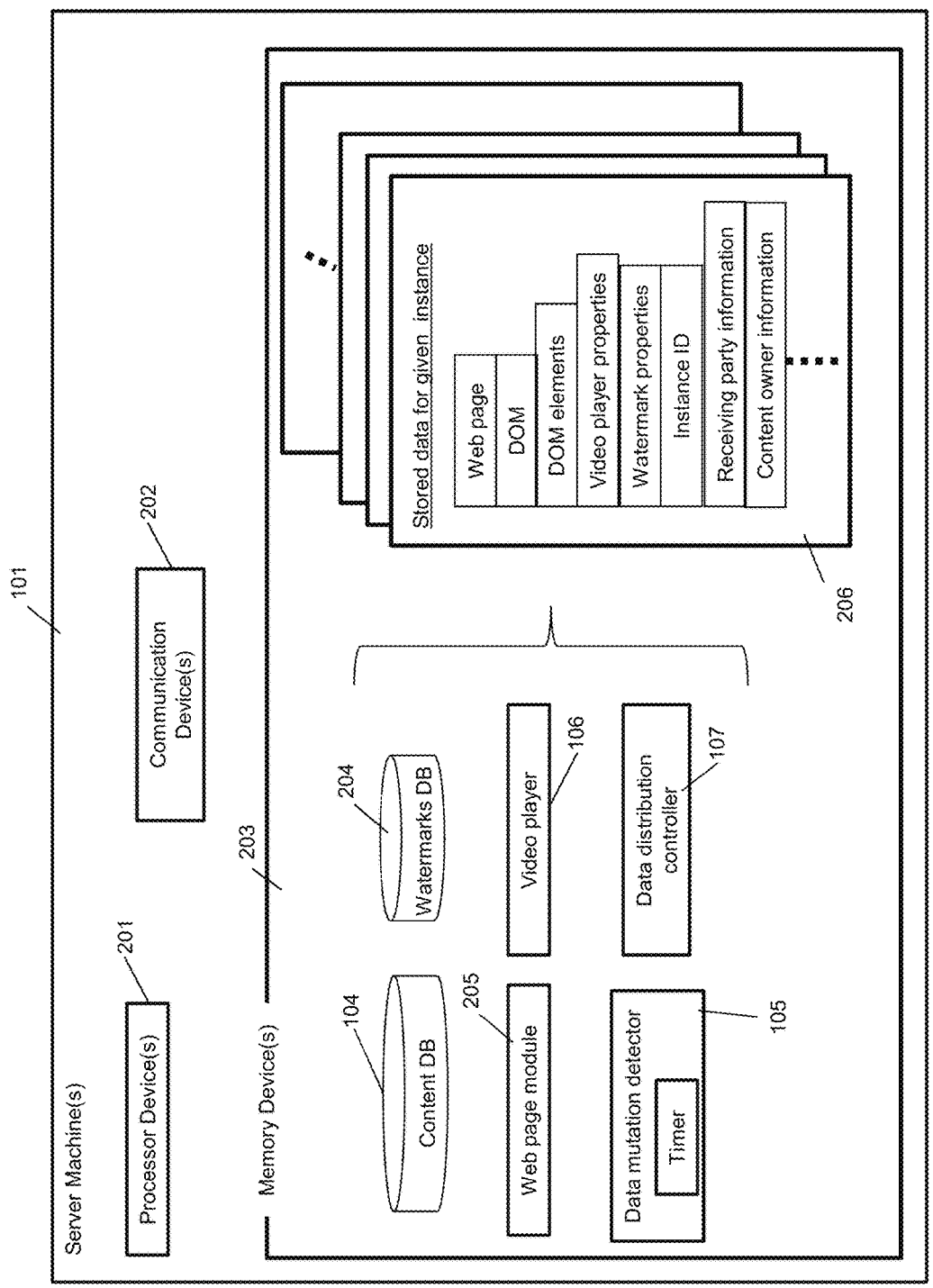
FIG. 2 is a schematic diagram of an example computing architecture of a server system including device components and data components stored in memory.

Turning to FIG. 2, a more detailed view of the components of the server 101 is shown. The server includes one or more processing devices 201. It also includes one or more communication devices 202 that transmit and receive data over the network 104. It also includes one or more memory devices 203.

These one or more memory devices 203 store a content database 103. The digital content, for example, is stored with identifiers so that it can be searched and retrieved. The memory 203 also stores a watermarks database 204 which stores digital watermark templates (or raw data for watermarks). The server can automatically modify these watermarks templates can be automatically modified (e.g. size, position, transparency or opaqueness setting, color, content of watermark, etc.). For example, the watermark template can include a static portion and a modifiable content portion, such as an ID portion (e.g. image, letters, numbers, symbols, etc.), that is modified to be unique for every instance of a video being sent to a different receiving user. For example, the instance of a video from Bob sent to Cody will have a watermark with a first ID, and the instance of the same video from Bob sent to Dave will have a watermark with a second ID.

In an example embodiment, the server sends a specific watermark and a specific ID portion to the second user device (also called the client device), and the executable instructions on the second user device include causing the second user device to compile the specific watermark and the specific ID portion to generate an applied watermark that is incorporated or embedded with the content data (e.g. video data or other data).

The memory 203 also includes a webpage module 205 that generates webpages with an embedded video player or other content player. The memory also includes a video player 106 that operates with the web page 205 to display or play video.

As noted above, the data mutation detector 105 includes executable instructions for detecting data mutations and memory for storing related data. It also includes, for example, a timer that is used to initiate a series of data mutation checks at timed intervals. The timer may be a static timer, which has a preset time interval, used to trigger the checks. In another example, the timer is a dynamic timer, which changes the lengths of the timed intervals. For example, the dynamic timer includes a randomizer that randomly determines the lengths of the timed intervals between consecutive checks. In this way, it is more difficult for an adversary to overcome the data mutation detector.

In another example aspect, the data mutation detector 105 also includes executable instructions and data for reacting to a detected mutation. For example, the instructions, when executed by the second user's user device, include stopping the playing of the current video content, loading a different web page, and sending an alert message to the server.

The memory 203 also includes a data distribution controller 107 which includes a database that stores an index of data links, related video content, related watermark(s), related receiving party (e.g. the second user) information, related content owner party (e.g. the first user) information, and related information regarding parameters for accessing and viewing the data by receiving party (e.g. the second user).

In an example embodiment, the server 101 stores in its memory 203 instances of the data to be sent to a given second user. An example of such an instance 206 includes the web page, the Document Object Model (DOM), the DOM elements, the video player properties, the watermark properties, an instance ID, the receiving party information, and the content owner information.

The DOM is a programming interface for HTML, XHTML and XML documents. It represents the page so that programs can change the document structure, style and content. The DOM represents the document as nodes and objects. For example, the document itself is a document node; HTML elements are element nodes; HTML attributes are attribute nodes; text inside HTML elements are text nodes; and comments are comment nodes. In this way, programming languages can connect to the page. A web page is a document that can be either displayed in the web browser window, or as the HTML source. But it is the same document in both cases. The DOM represents that same document so it can be manipulated. The DOM is an object-oriented representation of the web page, which can be modified with a scripting language such as, but not limited to, JavaScript.

In particular, when a web page is rendered in a web application (e.g. web browser) on the second user device 102, the web application downloads the executable instructions (e.g. HTML) into local memory and automatically parses it to display the page on screen. The web application creates a DOM of the page, which is an object oriented representation of an HTML document, that acts as an interface between JavaScript and the document itself.

In an example embodiment, the properties, such as the video player properties or the watermark properties, or both, are cascading style sheets (CSS), which describe how HTML elements are to be displayed on screen, paper, or in other media. In such an example embodiment, the video player and the watermark are DOM elements and their CSS data or related CSS files are determined by the server 101.

In another example embodiment, the style formatting of the elements may be embedded as tags directly into the web page (e.g. the HTML page).

Figure 3:
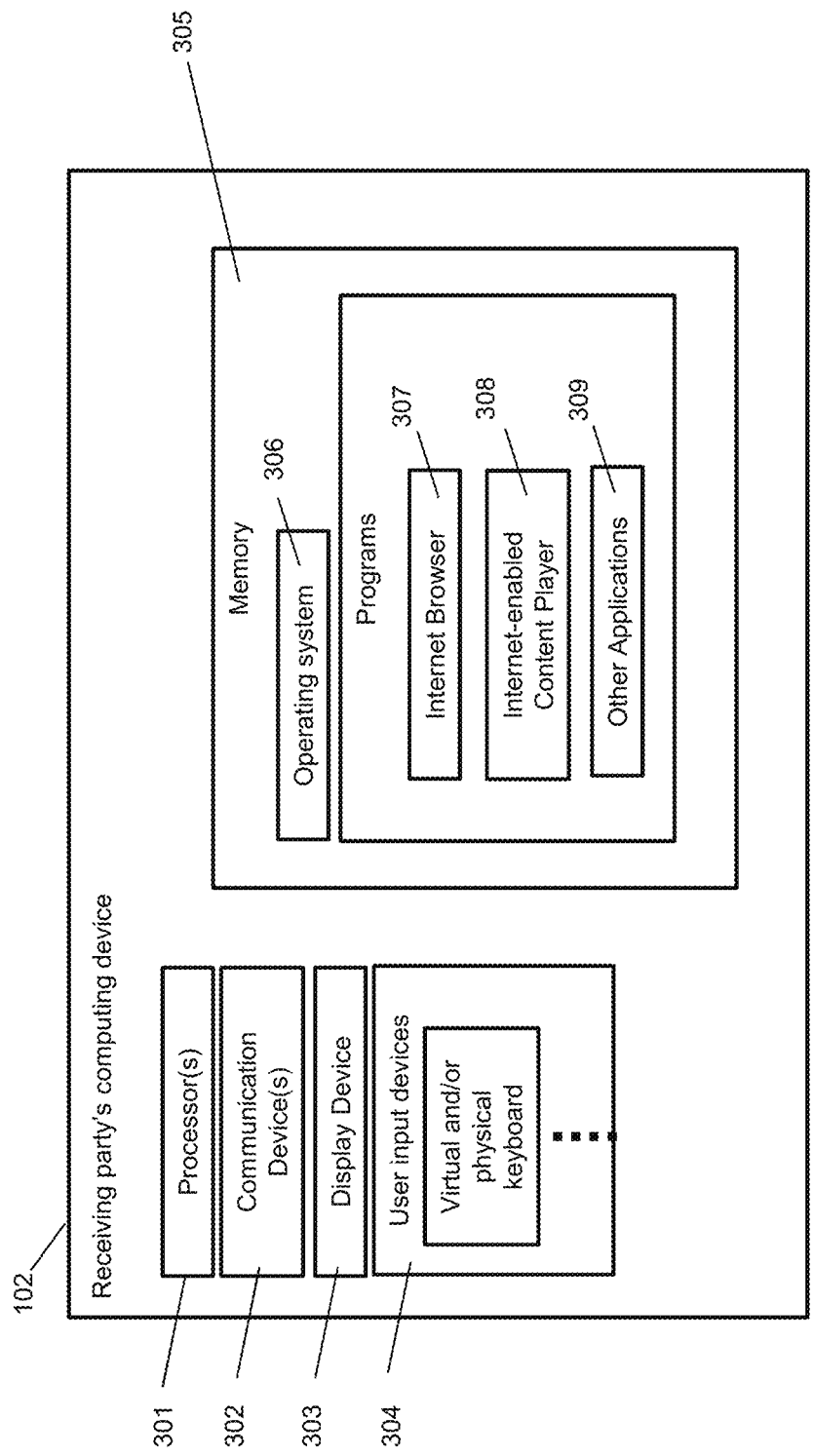
FIG. 3 is a schematic diagram of an example computing architecture of a receiving party's computing device including device components and data components stored in memory.

Turning to FIG. 3, an example of components of a receiving party's computing device (e.g. the second user device) 102 is shown. It includes one or more processors 301, one or more communication devices 302, a display device 303 or an audio device, or both, and one or more user input devices 304. The input devices 304 can include a physical keyboard or a virtual keyboard, or both. The input devices 304 can also include a pointing mechanism, such as a touch screen, touch surface, or a computer mouse. For example, the input device 304 is able to receiving user inputs to control the web application to view the video content. The input device may also be used by an adversary to attempt to change the received content data, or otherwise copy and distribute the content data.

The device 102 also includes memory device(s) that store an operating system 306 and one or more programs 307, 308, 309 that operate within the operating system. For example, the Internet browser 307 is an example of a web application. An Internet-enabled content player 308 (e.g. a video player, a multimedia player, a music player, etc.) is another example of a web application.

While many of examples relate to the second user device 102 playing content via the Internet browser, the processes and attributes are also applicable to other Internet-enabled applications residing on the second user device.

Figure 4:
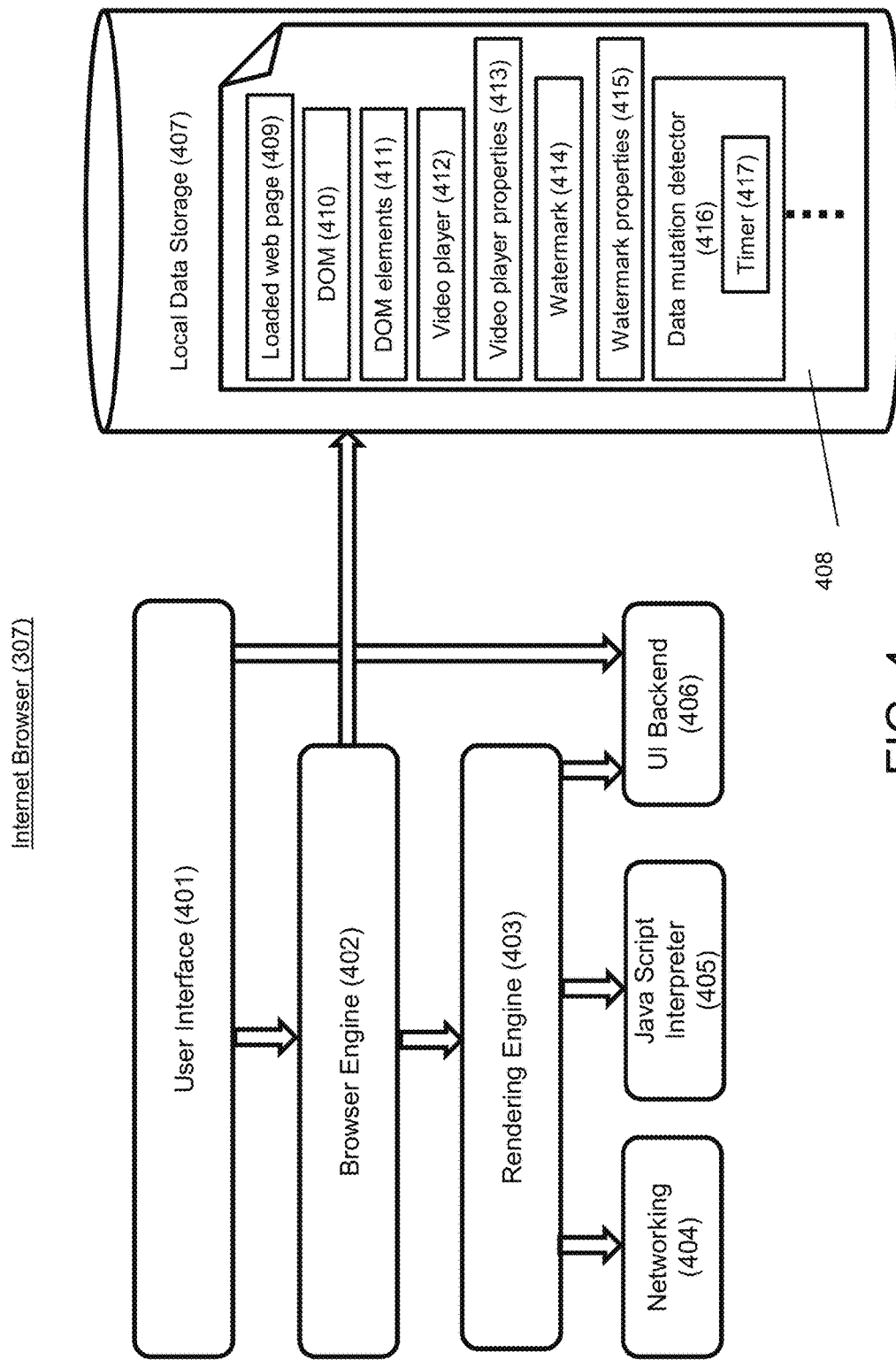
FIG. 4 is a schematic diagram of a data structure of an Internet browser on the receiving party's computing device.

Turning to FIG. 4, an example embodiment of a structure of the Internet browser 307 is provided. It includes a user interface (UI) 401 that interacts with a browser engine 402. The browser engine 402 interacts with a rendering engine 403. The rendering engine 403 in turn interacts with a networking module 404, a Java Script interpreter 405, and a UI backend 406. The UI 401 also interacts with the UI backend 406. The browser engine 402 interacts with local data storage 407.

The UI 401 includes executable instructions that facilitates interaction between users and the browser. Non-limiting examples of UI controls or UI elements includes an address bar, next and back buttons, buttons for home, refresh and stop, options to bookmark web pages, etc. The browser engine 402 includes executable instructions that, when executed, communicates the inputs of user interface with the rendering engine 403. The browser engine 402 is responsible for querying and manipulating the rendering engine according to the inputs from various user interfaces. The rendering engine 403 is responsible for displaying the requested content on the screen. The engine 403 first parses the HTML tags and then using the styles (e.g. CSS), it builds a render tree and finally a render layout, which displays the content on the display device 303. The networking module 404 is responsible to send various network calls, such as sending the http requests to the server 101. The Java Script interpreter 405 interprets the java script code presented in a web page. The UI backend 406 draws widgets on the browser like combo boxes, windows, etc. The local data storage 407 is a small database created on the local drive of the second computing device 102 where the Internet browser is installed. This data storage 407 stores various files like cache, cookies, and the data 408 sent by the server 101 in relation to the video content.

For example, the data storage 407 stores the loaded web page 409, the DOM 410, the DOM elements 411, the video player element 412, the video player properties 413, the watermark element 414, the watermark properties 415, and the data mutation detector 416, including its timer 417. The browser engine 402 accesses this data and the executable instructions of the data mutation detector 416. The browser engine 416 runs the one or more checks defined in executable instructions of the data mutation detector 416, and if the checks do not detect a mutation, then the rendering engine renders the display of the video content via a video player 412 that plays in the UI 410. Otherwise, if a mutation is detected, a different UI rendering is implemented, such as stopping or indefinitely pausing the playing of the video and then redirecting the Internet browser to load a different web page.

In an example embodiment, portions of the data 408 are stored in an inaccessible data portion of the data storage 407. In an example aspect, the inaccessible data portion is inaccessible due to the data format of the inaccessible data portion. In another example embodiment, the portions of the data 408 that are stored in the inaccessible data portion include the data mutation detector 416 (including the timer 417) and other properties or elements, or both. In another example embodiment, the portions of the data 408 that are stored in the inaccessible data portion include the watermark properties 415 and the data mutation detector 416 (including the timer 417).

In an example embodiment, the portions of the data 408 are held within one or more classes, which is or are an inaccessible data portion in the data storage 407. In this way, a user cannot access and modify the data (e.g. the content data). In particular, a class is a special function in the computer executable instructions that are defined with class expression or class declarations.

For example, in an implementation of a class declaration in JavaScript, to declare a class, the class keyword is used with the name of the class. In another example, in an implementation of a class expression in JavaScript, class expressions can be named or unnamed. The name given to a named class expression is local to the class's body.

For example, the watermark properties 415 and the data mutation detector 416 (including the timer 417) are stored in one or more classes. In another example, the data mutation detector 416 (including the timer 417) and other properties or elements, or both, are stored in one or more classes.

Figure 5:
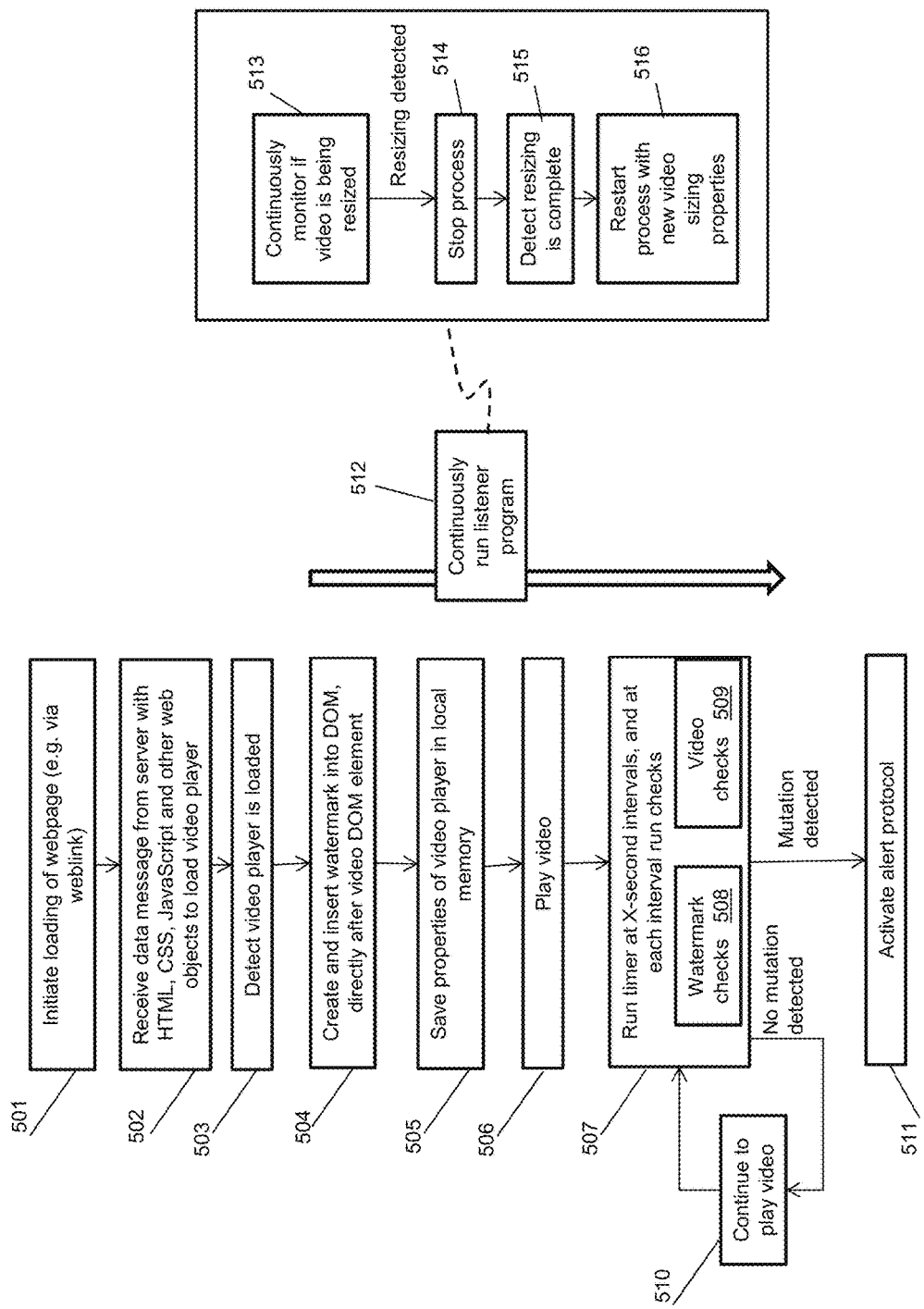
FIG. 5 is a flow diagram of example computer executable instructions for automatically detecting a data mutation.

Turning to FIG. 5, example executable instructions are shown that are executed by the second computing device 102 to locally detect data mutation. Block 501: Initiate loading a web page, for example, by a user selecting a web link (e.g. a URL).

Block 502: Received one or more data messages from the server 101, which include HTML, CSS, Java Script and other web objects to load the video player. In an example embodiment, the received data message(s) include the executable instructions in blocks 503 and onwards, which are stored in the data storage 407 and are executed by the second user device 102.

Block 503: Detect that the video player is loaded in the web application.

Block 504: Create and insert a watermark into the DOM, directly after the video element.

Block 505: Save the properties of the video player into the local data storage 407. The properties, for example, include the screen size of the video player (e.g. pixel width and pixel height). In another example, the location properties of the video player are saved, such as the top left corner pixel location, the top right corner pixel location, the bottom left corner pixel location, and the bottom right corner pixel location. These properties may depend on the second user device's display screen size, resolution, and how the user has sized the viewing area of the Internet browser window within the display device.

Block 506: Play the video.

Block 507: Run the timer at X-second interval. At each interval run one or more checks, such as one or more watermark checks 508 or one or more video checks 509, or both.

Block 510: If no mutation is detected from these one or more checks, then the second user device continues to play the video and the process repeats at block 507 at the end of each timed interval.

As noted above, the timed intervals may be regular, or they may be randomly timed.

In an example embodiment in which the time intervals are regular, X is two (2) seconds. However, other time lengths may be used for the regular time intervals.

Block 511: If a mutation is detected based on the one or more checks, then the second computing device 102 activates or initiates an alert protocol.

While blocks 504 to 510 are running, the second computing device also continuously runs a listener program 512. The listener program detects if the display size of the video is being resized (e.g. due to user input to change sizing of the web browser window, change of screen settings, change of display device altogether, etc.), and restarts the process. In particular, the operations include the following.

Block 513: Continuously monitor if the video is being resized.

Block 514: Responsive to detecting that the video has been resized, stop the process (e.g. of any of blocks 504 to 510).

Block 515: Detect that the resizing is complete.

Block 516: Restart the process using the new video sizing properties. For example, the process returns to block 504 and is restarted at that stage using the new video sizing properties.

If no resizing is detected by the listener program 512, then the operations in blocks 504 to 510 are unaffected by the listener program 512.

Figure 6:
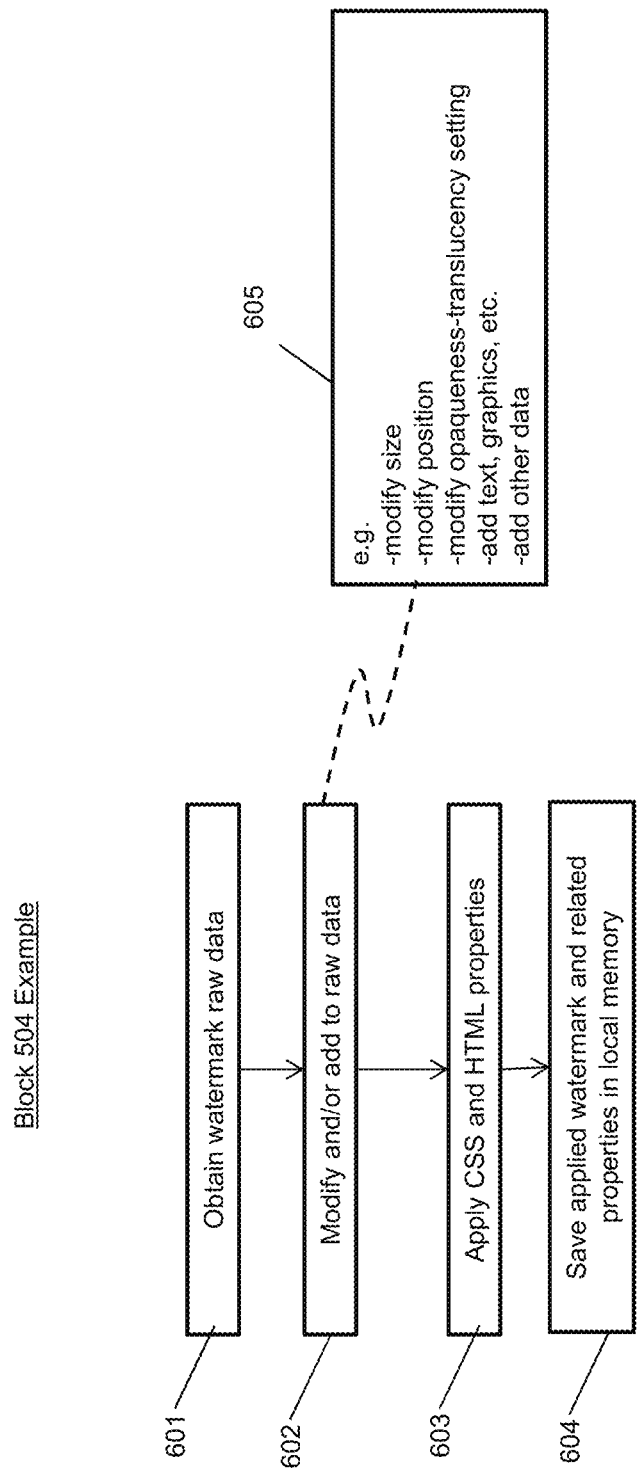
FIG. 6 is a flow diagram of example computer executable instructions for creating and inserting a watermark, according to an example aspect of an operation in FIG. 5.
Figure 7:
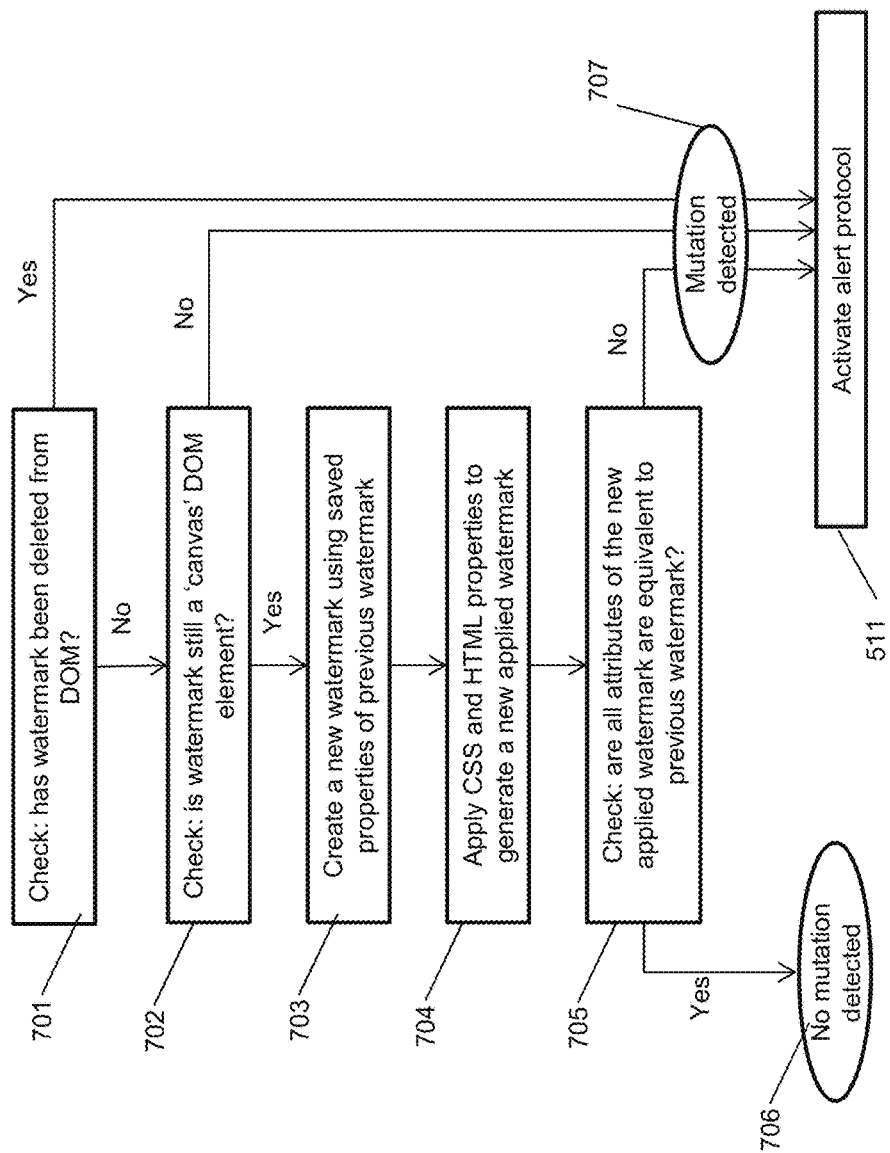
FIG. 7 is a flow diagram of example computer executable instructions for conducting a watermark check, according to an example aspect of an operation in FIG. 5.
Figure 8:
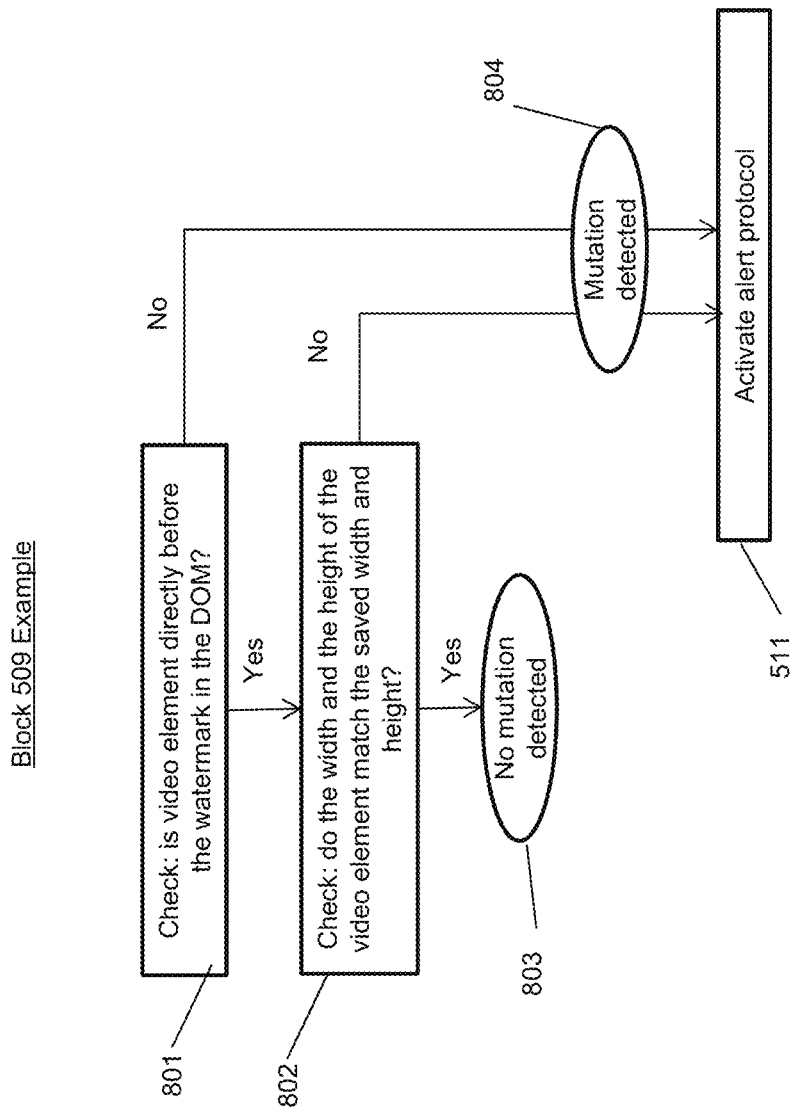
FIG. 8 is a flow diagram of example computer executable instructions for conducting a video content check, according to an example aspect of an operation in FIG. 5.
Figure 9:
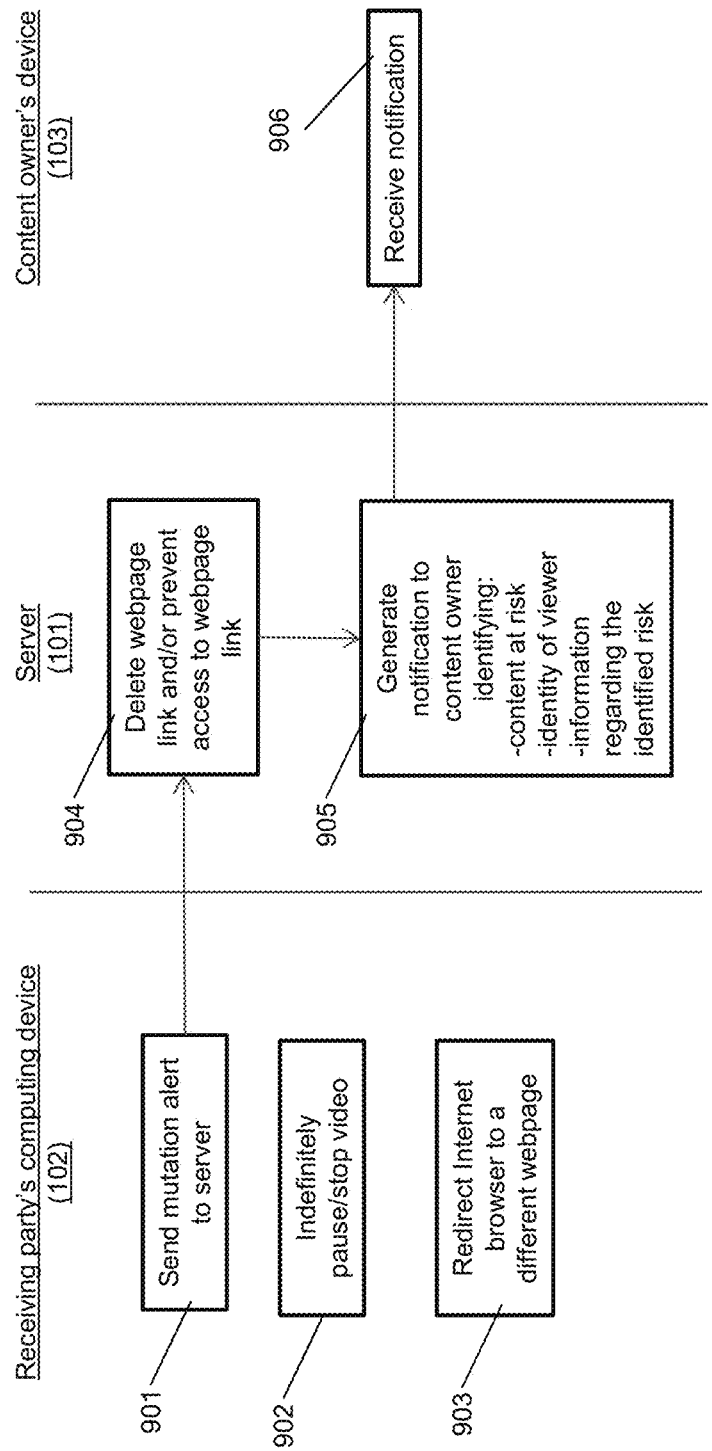
FIG. 9 is a flow diagram of example computer executable instructions for initiating an alert protocol, according to an example aspect of an operation in FIG. 5.

Additional example aspects of the process shown in FIG. 5 are described with respect to FIGS. 6 to 9. In particular, FIG. 6 describes example aspects of block 504. FIG. 7 describes example aspects of block 508. FIG. 8 describes example aspects of block 509. FIG. 9 describes example aspects of block 511.

Turning to FIG. 6, example executable instructions for implementing block 504 include the following.

Block 601: Obtain watermark raw data or watermark template.

Block 602: Modify and/or add to watermark template.

Block 603: Apply CSS and HTML properties to generate an applied watermark.

Block 604: Save the applied watermark and related properties in the local data storage 407.

In an example embodiment, blocks 601 to 603 are executed by the server, and the applied watermark is sent from the server to the second user device 102 so that the second user device stores the applied watermark (block 604). In another example embodiment, the server sends to the second user device 102 the watermark template and the modification and styling information, so that the second user device 102 executes the blocks 601 to 604.

In an example aspect, the modification of the watermark template, or the adding of data to the watermark template, or both, include one or more of the aspects of block 605. These include modifying the size of the watermark, the position of the watermark, and the opaqueness-translucency setting of the watermark. These aspects also include adding text, graphics, symbols, etc. to the watermark. Other modification and additions can be made.

Turning to FIG. 7, example executable instructions for implementing block 508 include the following.

Block 701: Check if the watermark has been deleted from the DOM. If not, no mutation is detected and the process proceeds to block 702. If it has been deleted, then a mutation is detected (block 707) and the process continues to block 511.

Block 702: Check if the watermark still has a 'canvas' DOM element. If so, no mutation is detected and the process continues to block 703. Otherwise, if the 'canvas' DOM element is missing, then a mutation is detected (block 707) and the process continues to block 511.

Although 'canvas' has been used, one or more other specified DOM elements can be used. In an example embodiment, the specified DOM element used in the check at block 702 is hardcoded into the data mutation detector.

In a further example aspect, the second user device has received the compiled data that includes an initial watermark DOM element when it initially loaded the webpage. Afterwards, the check (at block 702) includes checking if a current watermark is the same as the initial watermark DOM element at initial webpage load. The initial watermark DOM element could, for example, be a 'canvas' DOM element or some other specified DOM element. If the current watermark is the same as the initial watermark DOM element, then the process continues to block 704 and, otherwise, the client device detects the data mutation (block 707).

Block 703: Create a new watermark using the saved properties of the previous watermark.

Block 704: Apply the CSS and the HTML properties to generate a new applied watermark. For example, the CSS and the HTML properties are default properties. In an example aspect, the saved properties of the previous watermark are the default CSS object.

In an example embodiment, a default css object that is used is:
const cssObject={
position: 'fixed'
top: 0,
. . . etc
}

Block 705: Check if all the properties of the new applied watermark are equivalent to the previous watermark as saved in memory (e.g. local data storage 407). If so, then no mutation is detected as per block 706. Otherwise, if the properties of the new applied watermark are different from the previous watermark, then a mutation is detected (block 707) and the process continues to block 511.

Turning to FIG. 8, example executable instructions for implementing block 509 include the following.

Block 801: Check if the video element is directly before the watermark in the DOM. In another example embodiment, the data mutation detector checks if the video element is directly after the watermark in the DOM. If so, then there is no detected mutation and the process continues to block 802. Otherwise, if the video element and the watermark are relatively positioned somewhere else in the DOM or are not in the DOM, then a mutation is detected (block 804) and the process continues to block 511.

In a more general example embodiment, at the initial loading of the webpage, the data mutation detector saves an initial positioning of the video DOM element relative to the watermark DOM element in the DOM. Afterwards, at block 801, the data mutation detects if a current positioning of the video DOM element relative to the watermark DOM element in the DOM is the same as the initial positioning. If so, then there is no detected mutation and the process continues to block 802. Otherwise, a mutation is detected (block 804).

In one example of an initial positioning, the video element is directly after the watermark element. In another example of an initial positioning, the video element is directly before the watermark element. Other initial positions in the DOM are applicable to the principles described herein. In an example aspect, the positioning of the video element to the watermark element are measured or defined by the number of DOM elements between the video element and the watermark element, and the order of the watermark element relative to the video element.

Block 802: Check if the width and the height (e.g. pixel width and pixel height, or some other unit of measure) of the video element match the saved width and the height of the video element. If there is a match, then no mutation is detected (block 803). Otherwise, if the dimensions do not match, then a mutation is detected (block 804) and the process continues to block 511.

Turning to FIG. 9, example executable instructions for implementing block 511 include the following.

Block 901: Initiating or activating the alert protocol includes the second user device 102 sending a mutation alert message to the server 101.

Block 902: The second user device 102 also indefinitely pauses or stops the playing of the video.

Block 903: The second user device 102 redirects the Internet browser to a different web page.

Block 904: Responsive to block 901, the server 101 deletes the webpage data link, or prevents the access to the webpage, or both.

Block 905: Responsive to block 901, the server 101, generates a notification to the content owner identifying information regarding the data mutation.

Block 906: Responsive to block 905, the first user's device receives the notification.

Figure 10:
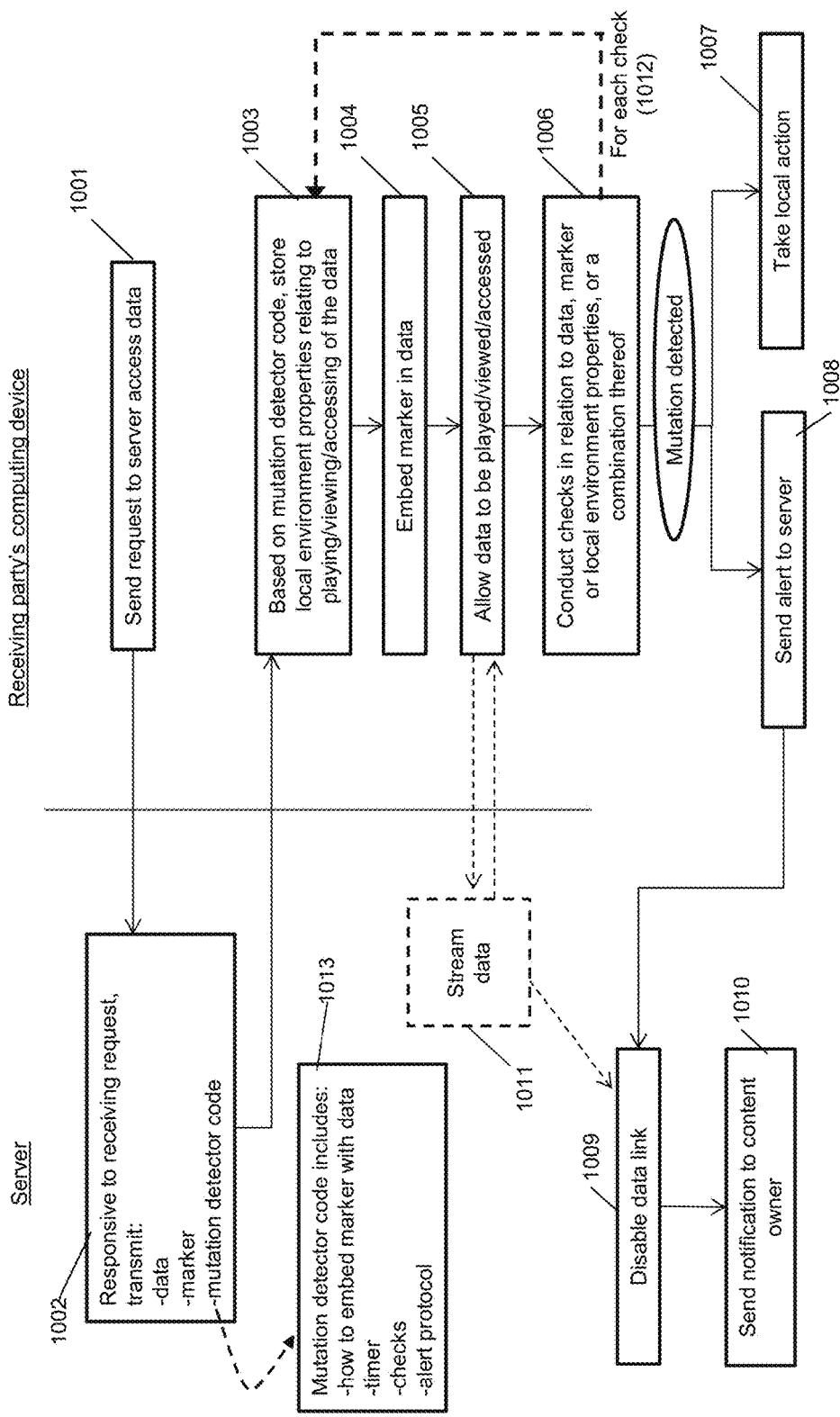
FIG. 10 is a flow diagram of example computer executable instructions for automatically detecting a data mutation according to another example embodiment.

Turning to FIG. 10, a more general example embodiment of executable instructions are provided for detecting mutations. Some of these instructions are executed by the server and some are executed by the second user device (also called the receiving party's computing device). These instructions are not specific to one type of content data, and can be used for detecting data mutations of various types of content data.

Block 1001: The receiving party's computing device sends a request to the server to access content data.

Block 1002: The server, responsive to the request, transmits the content data, the marker, and mutation detector code.

In an example aspect, the mutation detector code 1013 includes instructions specifying parameters for embedding or incorporating the marker with the content data, a timer, one or more checks, an alert protocol.

Block 1003: Based on the mutation detector code, the receiving party's computing device stores local environment properties relating to the playing/viewing/accessing of the content data. These local environment properties are specific to the program (e.g. player/viewer/etc.) used to play/view/access the content data. For example, for video player, these properties are the length and width of the video. However, other properties would be applicable for different types of content data and their related programs.

Block 1004: The receiving party's computing device embeds or incorporates the marker into or with the content data.

Block 1005: The receiving party's computing device allows the data to be played/viewed/accessed.

Block 1006: The receiving party's computing device conducts checks in relation to the data, marker, or local environment properties, or a combination thereof. If a mutation is detected, then the process continues to blocks 1007 and 1008.

Block 1007: Responsive to detecting a mutation, the receiving party's computing device takes local action.

Block 1008: Responsive to detecting a mutation, the receiving party's computing device sends an alert to the server.

Block 1009: Responsive to block 1008, the server disables the data link that allows the content data to be accessed by external computing devices (e.g. including, but not limited to, the receiving party's computing device).

Block 1010: The server sends a notification to the content owner.

In an example aspect, in the process of allowing the content data to be played/viewed/accessed, the server streams the content data (block 1011) to the receiving party's computing device. This streaming of data stops as part of the action taken by the server at block 1009.

In another example aspect, at block 1006, if there is no detected mutation, then the process loops back to block 1003 and repeats (operation 1012).

In yet another example embodiment, the server and the second user device (e.g. also called the receiving party's computing device or the client device) conduct checks that do not use a marker. In particular, FIG. 11 shows example executable instructions for such an embodiment, which are mostly similar to the blocks in FIG. 10.

Figure 11:
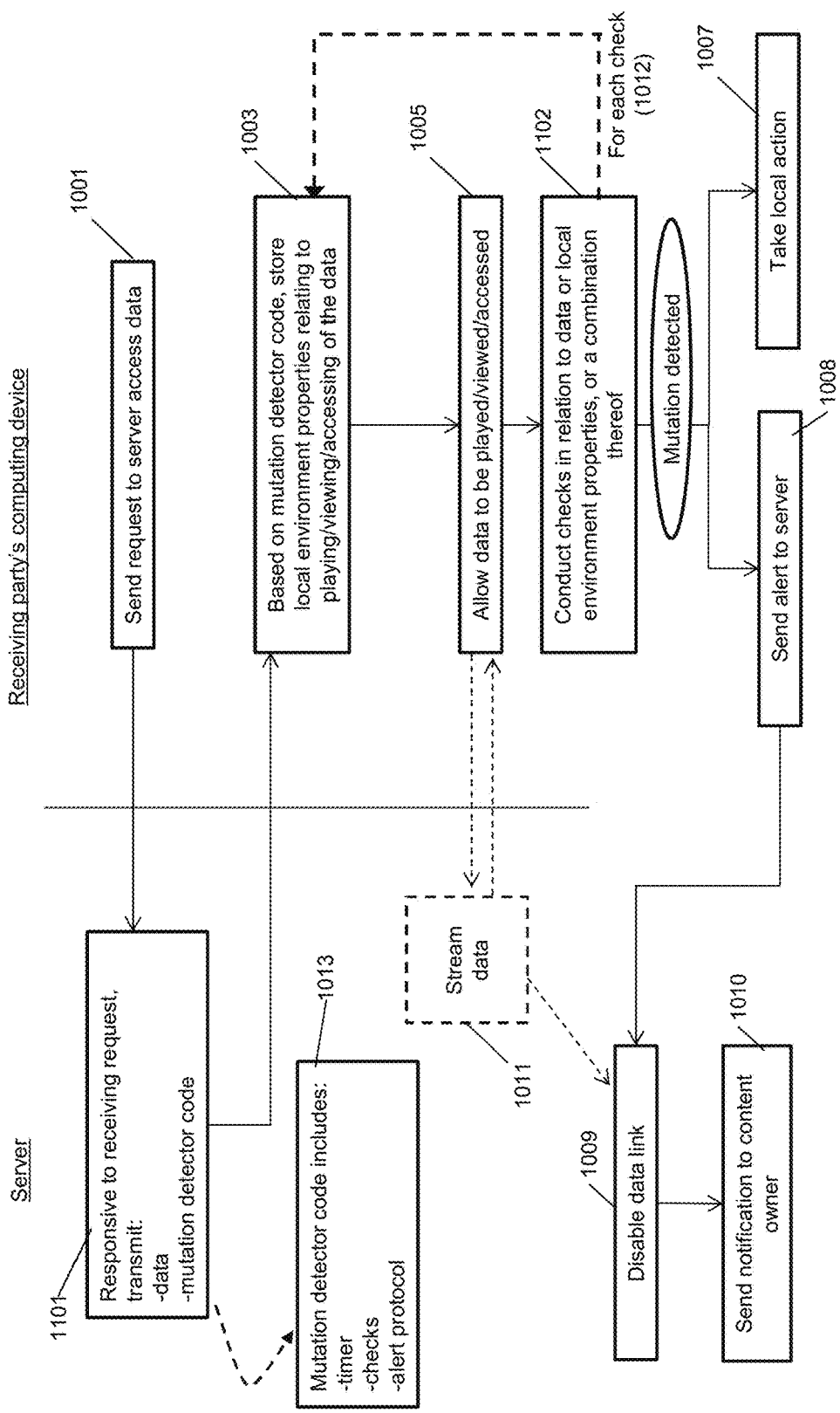
FIG. 11 is a flow diagram of another example embodiment of computer executable instructions for automatically detecting a data mutation, but without a marker.

However, in FIG. 11, at block 1101 (instead of block 1002), the server, responsive to the request, transmits the content data and mutation detector code. In an example aspect, the mutation detector code 1013 includes instructions specifying parameters for a timer, one or more checks, and an alert protocol. Furthermore, the operations in block 1004 of FIG. 10 are not required. Furthermore, at block 1102 (instead of block 1006), the receiving party's computing device conducts to checks in relation to the data or the local environment properties, or both.

In other words, the data mutation detector conducts checks in relation to anomaly changes in the content data or the environment properties of the web application or the player/viewer application running within the web application, or a combination thereof. In an example embodiment, these changes are detected by having hardcoded properties that are used to compare against the current properties to detected differences. In another example embodiment, these changes are detected by recording initial properties upon loading the webpage at the client device, and then later comparing the current properties with the recorded initial properties. In an example embodiment, these initial properties or hardcoded properties, or both, are in the form of DOM elements that are stored in classes. In an example embodiment, these properties are in form of HTML and/or CSS data.

Below are other example embodiments and related example aspects.

In a general example embodiment, a server system is provided that detects client-side data mutations. The server system includes a communication device in communication with a network and that receives a request to access video data, the request being transmittable from a client device. The server system also includes a processor that, responsive to the request, compiles data stored on one or more memory devices, the compiled data including a webpage, the video data, a watermark and executable instructions for detecting data mutations. The executable instructions, which are executable by the client device, include: embedding the watermark into the webpage; saving properties of the video player in memory local to the client device; playing the video data within the webpage; executing one or more checks at timed intervals; and, responsive to detecting a data mutation based on the one or more checks, initiating an alert protocol. The alert protocol includes sending an alert message to the server system. The communication device transmits the compiled data that is receivable by the client device. The communication device receives the alert message that is transmittable by the client device and, in response, the processor stops external access to the webpage and the video data.

In an example aspect, the request is associated with a network data link that identifies the video data, and the server system stores the network data link in the one or more memory devices.

In another example aspect, the network data link is associated with a receiving party associated with the watermark and contact information of a receiving party.

In another example aspect, the one or more memory devices of the server system store a watermarks database comprising different watermark templates, and the processor obtains a specific watermark template from the watermark database and associated watermark properties to form the watermark that is transmitted in the compiled data.

In another example aspect, the processor selects the specific watermark template and the associated watermark properties based on information in the request.

In another example aspect, the one or more memory devices of the server system store a video database comprising different videos, including the video data transmitted in the compiled data, and the processor selects and obtains the video data from the video database based on information in the request.

In another example aspect, the compiled data further includes watermark properties.

In another example aspect, the watermark properties include position coordinates of the watermark within the video player.

In another example aspect, the watermark properties include size dimensions of the watermark.

In another example aspect, the compiled data includes a DOM and the one or more checks include checking if the watermark has been deleted from the DOM, and if so, detecting the data mutation.

In another example aspect, the compiled data includes a DOM and the one or more checks include checking if the watermark is a specific DOM element, and if not, detecting the data mutation.

In another example aspect, the compiled data includes a DOM and the watermark, wherein the watermark is an initial watermark DOM element at an initial loading of the webpage at the client device, and wherein the one or more checks comprise checking if a current watermark is the same as the initial watermark DOM element, and if not, detecting the data mutation.

In another example aspect, the compiled data further includes watermark properties and wherein the one or more checks include: creating a new watermark based on the watermark and the watermark properties; applying CSS and HTML properties to the new watermark to generate a new applied watermark; checking if properties of the new applied watermark are equivalent to the watermark properties of the watermark, and if not, detecting the data mutation.

In another example aspect, the compiled data includes a DOM, a video DOM element associated with the video data, and a watermark DOM element associated with the watermark. Furthermore, the one or more checks include checking that the video DOM element is directly before the watermark DOM element in the DOM, and if not, detecting the data mutation. In another embodiment, the one or more checks include checking that the video DOM element is directly after the watermark DOM element in the DOM, and if not, detecting the data mutation.

In another example aspect, the compiled data includes a DOM, a video DOM element associated with the video data, a watermark DOM element associated with the watermark, and an initial positioning of the video DOM element relative to the watermark DOM element in the DOM. The one or more checks include checking if a current positioning of the video DOM element relative to the watermark DOM element in the DOM is the same as the initial positioning, and if not, detecting the data mutation.

In another example aspect, the one or more checks include saving a width and a height of the video in the memory local to the client device, and checking if a current width and a current height of the video match the width and the height saved in the memory local to the client device. If there is no match, the data mutation is detected.

In another example aspect, the video data in the compiled data is an intermediate data link to the actual video content that is stored in another server system (e.g. a third party server).

In another general example embodiment, a server system is provided that detects client-side data mutations. The server system includes a communication device in communication with a network. The communication device receives a request to access content data, the request being transmittable from a client device. The server system also includes a processor that, responsive to the request, compiles data stored on one or more memory devices. The compiled data includes the content data and executable instructions for detecting data mutations. The executable instructions, which are executable by the client device, include: storing local environment properties relating to playing or viewing or accessing the content data; allowing the content data to be played or viewed or accessed; conducting one or more checks in relation to at least one of the content data and the local environment properties; and, responsive to detecting a data mutation based on the one or more checks, initiating an alert protocol. The alert protocol includes sending an alert message to the server. The communication device transmits the compiled data that is receivable by the client device. The communication device also receives the alert message that is transmittable by the client device and, in response, the processor stops external access to the content data.

In an example aspect, the compiled data further includes a mark. The executable instructions further include incorporating the mark with the content data. Accordingly, the one more checks include also include conducting a check in relation to the mark.

In another example aspect, the one or more memory devices store the content data, and subsequent to the communication device transmitting the compiled data, the communication device transmits a stream comprising portions of the content data, the stream receivable by the client device.

In another example aspect, the content data includes audio data and the marker is an audio marker.

In another example aspect, the audio marker is inaudible to human ears.

In another example aspect, the compiled data further includes audio marker properties, which include at least one of: a volume, a frequency, and a duration.

In another example aspect, the content data includes text data.

In another example aspect, the content data comprises static image data or vector image data, or both.

In another example aspect, the marker is a pixel marker.

In another example aspect, the marker is visible to human eyes.

In another example aspect, the marker is undetectable by human eyes and is only detectable by a computing device.

In another example aspect, the compiled data includes a DOM and the one or more checks comprise checking if the mark has been deleted from the DOM, and if so, detecting the data mutation.

In another example aspect, the compiled data includes a DOM and the one or more checks comprise checking if the mark is a specific DOM element (e.g. a 'canvas' element or some other specified element hardcoded into the data mutation detector), and if not, detecting the data mutation.

In another example aspect, the compiled data further includes mark properties and wherein the one or more checks include: creating a new mark based on the watermark and the mark properties; applying CSS and HTML properties to the new mark to generate a new applied mark; checking if properties of the new applied mark are equivalent to the mark properties of the mark, and if not, detecting the data mutation.

In another example aspect, the compiled data includes a DOM, a content data DOM element associated with the content data, and a mark DOM element associated with the mark. Furthermore, the one or more checks include checking that the content data DOM element is directly before the content DOM element in the DOM, and if not, detecting the data mutation.

In another example aspect, the video data in the compiled data is an intermediate data link to the actual video content that is stored in another server system (e.g. a third party server).

In another example aspect, the content data in the compiled data is an intermediate data link to the actual video content that is stored in another server system (e.g. a third party server).

In another general example embodiment, a server system is provided that detects client-side data mutations. The server system includes a communication device in communication with a network. The communication device receives a request to access content data, the request being transmittable from a client device. The server system also includes a processor that, responsive to the request, compiles data stored on one or more memory devices. The compiled data includes the content data, a mark, and executable instructions for detecting data mutations. The executable instructions, which are executable by the client device, include: storing local environment properties relating to playing or viewing or accessing the content data; incorporating the mark with the content data; allowing the content data to be played or viewed or accessed; conducting at least one check in relation to the marker; and, responsive to detecting a data mutation based on the at least one check, initiating an alert protocol. The alert protocol includes sending an alert message to the server. The communication device transmits the compiled data that is receivable by the client device. The communication device also receives the alert message that is transmittable by the client device and, in response, the processor stops external access to the content data.

In yet another general example embodiment, a client device (e.g. a second user device or a receiving party's computing device) is provided that detects data mutations. The client device includes a communication device in communication with a network and that transmits a request to access video data. The request is receivable by a server system. The communication device, subsequent to request, receives compiled data that includes a webpage, the video data, a watermark and executable instructions for detecting data mutations, the compiled data transmittable by the server system. The client device also includes one or more memory devices that store a web application. The web application includes local data storage in the one or more memory devices, and the local data storage stores the compiled data. The client device also includes a processor that executes the executable instructions, including: embedding the watermark into the webpage; saving properties of the video player in the local data storage; playing the video data within the webpage; executing one or more checks at timed intervals; and, responsive to detecting a data mutation based on the one or more checks, initiating an alert protocol. The client device also includes a display device that displays web application to play the video data.

In an example aspect, the alert protocol comprises the client device stopping playing of the video data responsive to detecting the data mutation.

In another example aspect, the alert protocol includes the client device sending an alert message to the server system responsive to detecting the data mutation.

In another example aspect, the video data in the compiled data is an intermediate data link to the actual video content that is stored in another server system (e.g. a third party server).

In another example aspect, the web application is an Internet browser.

In another general example embodiment, a client device that detects data mutations. The client device includes a communication device in communication with a network and that transmits a request to access content data, the request being receivable by a server system. The communication device, subsequent to the request, receives compiled data that comprises a webpage, the content data, and executable instructions for detecting data mutations, the compiled data transmittable by the server system. The client device also includes one or more memory device that store a web application, the web application including local data storage in the one or more memory devices, and wherein the local data storage stores the compiled data. The client device also includes a processor that executes the executable instructions. The executable instructions include: storing local environment properties relating to playing or viewing or accessing the content data; conducting one or more checks in relation to at least one of the content data and the local environment properties; and responsive to detecting a data mutation based on the one or more checks, initiating an alert protocol, the alert protocol including sending an alert message to the server system. The client device also includes a display device that displays the web application to play or view or access the content data.

In an example aspect, the compiled data further includes a mark. The executable instructions further include incorporating the mark with the content data. Accordingly, the one more checks include also include conducting a check in relation to the mark.

In another example aspect, the content data in the compiled data is an intermediate data link to the actual content data (e.g. actual video data or another type of data), and the client device uses the intermediate data link to communicate with another server system (e.g. a third party server) to access the actual content data (e.g. actual video data or another type of data).

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It is also appreciated that the features described herein may be combined in different ways, even though those combinations are not explicitly described in the context of the example embodiments. The example embodiments are provided to convey the features in an example context, but other different combinations of the described features are also encompassed by the proposed systems and methods.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server system 101, the computing devices in communication thereto (e.g. devices 102, 103), or any component of or related to the server system 101, etc., or accessible or connectable thereto. Any application or module herein described may be implemented using computer readable/executable instructions that may be stored or otherwise held by such computer readable media.

Although the above principles have been described with reference to certain specific examples, various modifications thereof will be apparent to those skilled in the art as outlined in the appended claims.

The invention claimed is:

1. A server system that detects client-side data mutations, the server system comprising:
a communication device in communication with a network and that receives a request to access video data, the request being transmittable from a client device;
a processor that, responsive to the request, compiles data stored on one or more memory devices, the compiled data comprising a webpage, the video data, a watermark and executable instructions for detecting data mutations;
the executable instructions, which are executable by the client device, comprising:
embedding the watermark into the webpage;
saving properties of the video player in memory local to the client device;
playing the video data within the webpage;
executing one or more checks at timed intervals;
detecting a data mutation based on the one or more checks; and
initiating an alert protocol upon detecting the data mutation, the alert protocol including sending an alert message to the server system;
the communication device transmitting the compiled data that is receivable by the client device; and
the communication device receiving the alert message that is transmittable by the client device and, in response, the processor stopping external access to the webpage and the video data.

2. The server system of claim 1 wherein the request is associated with a network data link that identifies the video data, and the server system stores the network data link in the one or more memory devices.

3. The server system of claim 2 wherein the network data link is associated with a receiving party associated with the watermark and contact information of a receiving party.

4. The server system of claim 1 wherein the one or more memory devices of the server system store a watermarks database comprising different watermark templates, and the processor obtains a specific watermark template from the watermark database and associated watermark properties to form the watermark that is transmitted in the compiled data.

5. The server system of claim 4 wherein the processor selects the specific watermark template and the associated watermark properties based on information in the request.

6. The server system of claim 1 wherein the one or more memory devices of the server system store a video database comprising different videos, including the video data transmitted in the compiled data, and the processor selects and obtains the video data from the video database based on information in the request.

7. The server system of claim 1 wherein the compiled data further comprises watermark properties.

8. The server system of claim 7 wherein the watermark properties include position coordinates of the watermark within the video player.

9. The server system of claim 7 wherein the watermark properties include size dimensions of the watermark.

10. The server system of claim 1 wherein the compiled data includes a document object model (DOM) and the one or more checks comprise checking if the watermark has been deleted from the DOM, and if so, detecting the data mutation.

11. The server system of claim 1 wherein the compiled data includes a document object model (DOM) and the one or more checks comprise checking if the watermark is a specific DOM element, and if not, detecting the data mutation.

12. The server system of claim 1 wherein the compiled data includes a document object model (DOM) and the watermark, wherein the watermark is an initial watermark DOM element at an initial loading of the webpage at the client device, and wherein the one or more checks comprise checking if a current watermark is the same as the initial watermark DOM element, and if not, detecting the data mutation.

13. The server system of claim 1 wherein the compiled data further comprises watermark properties and wherein the one or more checks comprise:
  creating a new watermark based on the watermark and the watermark properties;
  applying cascading style sheet (CSS) and HTML properties to the new watermark to generate a new applied watermark;
  checking if properties of the new applied watermark are equivalent to the watermark properties of the watermark, and if not, detecting the data mutation.

14. The server system of claim 1 wherein the compiled data includes a document object model (DOM), a video DOM element associated with the video data, a watermark DOM element associated with the watermark, and
  wherein the one or more checks comprise checking that the video DOM element is directly before or after the watermark DOM element in the DOM, and if not, detecting the data mutation.

15. The server system of claim 1 wherein the compiled data includes a document object model (DOM), a video DOM element associated with the video data, a watermark DOM element associated with the watermark, and an initial positioning of the video DOM element relative to the watermark DOM element in the DOM; and
  wherein the one or more checks comprise checking if a current positioning of the video DOM element relative to the watermark DOM element in the DOM is the same as the initial positioning, and if not, detecting the data mutation.

16. The server system of claim 1 wherein the one or more checks comprise saving a width and a height of the video in the memory local to the client device, and checking if a current width and a current height of the video match the width and the height saved in the memory local to the client device, and if not, detecting the data mutation.

17. A server system that detects client-side data mutations, the server system comprising:
  a communication device in communication with a network and that receives a request to access content data, the request being transmittable from a client device;
  a processor that, responsive to the request, compiles data stored on one or more memory devices, the compiled data comprising the content data, and executable instructions for detecting data mutations;
  the executable instructions, which are executable by the client device, comprising:
    storing local environment properties relating to playing or viewing or accessing the content data;
    allowing the content data to be played or viewed or accessed;
    conducting one or more checks in relation to at least one of the content data and the local environment properties;
    detecting a data mutation based on the one or more checks; and
    initiating an alert protocol upon detecting the data mutation, the alert protocol including sending an alert message to the server system;
  the communication device transmitting the compiled data that is receivable by the client device; and
  the communication device receiving the alert message that is transmittable by the client device and, in response, the processor stopping external access to the content data.

18. The server system of claim 17, wherein the one or more memory devices store the content data, and subsequent to the communication device transmitting the compiled data, the communication device transmits a stream comprising portions of the content data, the stream receivable by the client device.

19. The server system of claim 17 wherein the content data comprises audio data and the marker is an audio marker.

20. The server system of claim 19, wherein the compiled data further comprises an audio marker, and the executable instructions further comprise incorporating the audio marker with the audio data.

21. The server system of claim 19 wherein the content data comprises an intermediate data link to a third party server that stores actual content data, and the executable instructions further comprise communicating with the third party server to obtain the actual content data.

22. The server system of claim 17 wherein the content data comprises at least one of text data, static image data and vector image data.

23. The server system of claim 17 wherein the compiled data further comprises a marker, and the executable instructions include incorporating the marker into the content data, and conducting a check in relation to the marker.

24. The server system of claim 23 wherein the compiled data includes a document object model (DOM) and the one or more checks comprise checking if the mark has been deleted from the DOM, and if so, detecting the data mutation.

25. The server system of claim 23 wherein the compiled data includes a document object model (DOM) and the one or more checks comprise checking if the mark is a specific DOM element, and if not, detecting the data mutation.

26. The server system of claim 23 wherein the compiled data further comprises mark properties and wherein the one or more checks comprise:
  creating a new mark based on the watermark and the mark properties;
  applying cascading style sheet (CSS) and HTML properties to the new mark to generate a new applied mark;
  checking if properties of the new applied mark are equivalent to the mark properties of the mark, and if not, detecting the data mutation.

27. The server system of claim 23 wherein the compiled data includes a document object model (DOM), a content data DOM element associated with the content data, a mark DOM element associated with the mark, and
  wherein the one or more checks comprise checking that the content data DOM element is directly before or after the content DOM element in the DOM, and if not, detecting the data mutation.

28. The server system of claim 17 wherein the compiled data includes a document object model (DOM), a content data DOM element associated with the content data, a mark DOM element associated with the mark, and an initial positioning of the content data DOM element relative to the mark DOM element in the DOM; and
  wherein the one or more checks comprise checking if a current positioning of the content data DOM element relative to the mark DOM element in the DOM is the same as the initial positioning, and if not, detecting the data mutation.

29. A client device that detects data mutations, the client device comprising:
  a communication device in communication with a network and that transmits a request to access video data, the request being receivable by a server system;
  the communication device, subsequent to the request, receives compiled data that comprises a webpage, the video data, a watermark and executable instructions for detecting data mutations, the compiled data transmittable by the server system;

one or more memory device that stores a web application, the web application including local data storage in the one or more memory devices, and wherein the local data storage stores the compiled data;

a processor that executes the executable instructions, comprising:
  embedding the watermark into the webpage;
  saving properties of the video player in the local data storage;
  playing the video data within the webpage;
  executing one or more checks at timed intervals;
  detecting a data mutation based on the one or more checks; and
  initiating an alert protocol upon detecting the data mutation; and a display device that displays the web application to play the video data.

30. A client device that detects data mutations, the client device comprising:

a communication device in communication with a network and that transmits a request to access content data, the request being receivable by a server system; the communication device, subsequent to the request, receives compiled data that comprises a webpage, the content data, and executable instructions for detecting data mutations, the compiled data transmittable by the server system;

one or more memory device that stores a web application, the web application including local data storage in the one or more memory devices, and wherein the local data storage stores the compiled data;

a processor that executes the executable instructions, comprising:
  storing local environment properties relating to playing or viewing or accessing the content data;
  allowing the content data to be played or viewed or accessed;
  conducting one or more checks in relation to at least one of the content data and the local environment properties;
  detecting a data mutation based on the one or more checks; and
  initiating an alert protocol upon detecting the data mutation, the alert protocol including sending an alert message to the server system;

a display device that displays the web application to play or view or access the content data.

* * * * *